United States Patent
Chervenka et al.

(10) Patent No.: US 7,664,615 B2
(45) Date of Patent: Feb. 16, 2010

(54) METHOD FOR DETERMINING A CRITICAL REDUCTION IN SHAFT SPEED IN A WORK MACHINE

(75) Inventors: Kirk J. Chervenka, Bettendorf, IA (US); Aaron M. Senneff, Ankeny, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 12/052,215

(22) Filed: Mar. 20, 2008

(65) Prior Publication Data
US 2009/0240465 A1 Sep. 24, 2009

(51) Int. Cl.
*G01P 3/00* (2006.01)
(52) U.S. Cl. .................... 702/145; 702/147
(58) Field of Classification Search ............ 702/34, 702/35, 142, 145; 123/90.11, 90.15, 295, 123/299
See application file for complete search history.

(56) References Cited

U.S. PATENT DOCUMENTS

| | | | |
|---|---|---|---|
| 5,752,210 A * | 5/1998 | Kato et al. .................... 701/51 |
| 5,855,108 A | 1/1999 | Salz et al. | |
| 5,978,720 A | 11/1999 | Hieronymus et al. | |
| 2004/0102289 A1 * | 5/2004 | Aikawa et al. .............. 477/176 |

FOREIGN PATENT DOCUMENTS

JP    4209930    7/1992

* cited by examiner

*Primary Examiner*—Bryan Bui
(74) *Attorney, Agent, or Firm*—Taylor & Aust, P.C.

(57) ABSTRACT

A method for determining a critical reduction in shaft speed in a work machine having at least one monitored shaft driven by a crankshaft of an engine includes determining an actual rotational speed of the crankshaft; determining an actual rotational speed of a first monitored shaft; determining a filtered rotational speed of the first monitored shaft based on an algorithm that utilizes the actual rotational speed of the first monitored shaft, the actual rotational speed of the crankshaft, and a reference rotational speed of the crankshaft; comparing the filtered rotational speed to the actual rotational speed of the first monitored shaft; determining whether the actual rotational speed of the first monitored shaft deviates from the filtered rotational speed by a predetermined amount; and activating an alarm if the actual rotational speed of the first monitored shaft deviates from the filtered rotational speed by the predetermined amount.

17 Claims, 4 Drawing Sheets ent invention may be used with

METHOD FOR DETERMINING A CRITICAL REDUCTION IN SHAFT SPEED IN A WORK MACHINE

FIELD OF THE INVENTION

The present invention is directed to a work machine, and, more particularly, to a method for determining a critical reduction in shaft speed in a work machine.

BACKGROUND OF THE INVENTION

One type of work machine is an agricultural combine. Agricultural combines are engine powered machines that harvest, thresh, separate and clean an agricultural crop. The resulting clean grain is stored in a grain tank located on the combine. The clean grain can then be transported from the grain tank to a truck, grain cart or other receiving bin by an unloading auger.

Agricultural combines have several rotating shafts (e.g., rotor, clean grain elevator, etc.) that are monitored for changes in speed. Typically, a large table is maintained that indicates the allowed speed range for each shaft based on machine type and other customer settings. When the shaft speed falls below the value as defined in this table, a low shaft speed alarm is activated to notify the operator.

However, with this approach, with every change in machine settings and options, the table becomes more difficult to maintain. Also, an operator may experience the occasional nuisance alarm when nothing is wrong.

SUMMARY OF THE INVENTION

The invention, in one form thereof is directed to a method for determining a critical reduction in shaft speed in a work machine having at least one monitored shaft driven by a crankshaft of an engine. The method includes determining an actual rotational speed of the crankshaft; determining an actual rotational speed of a first monitored shaft; determining a filtered rotational speed of the first monitored shaft based on an algorithm that utilizes the actual rotational speed of the first monitored shaft, the actual rotational speed of the crankshaft, and a reference rotational speed of the crankshaft; comparing the filtered rotational speed of the first monitored shaft to the actual rotational speed of the first monitored shaft; determining whether the actual rotational speed of the first monitored shaft deviates from the filtered rotational speed of the first monitored shaft by a predetermined amount; and activating an alarm if the actual rotational speed of the first monitored shaft deviates from the filtered rotational speed of the first monitored shaft by the predetermined amount.

The invention, in another form thereof, is directed to a method for determining a critical reduction in shaft speed in a work machine having at least one monitored shaft driven by a crankshaft of an engine. The method includes determining an actual rotational speed of the crankshaft; determining an actual rotational speed of a first monitored shaft; determining a biased rotational speed of the first monitored shaft based at least on the actual rotational speed of the first monitored shaft, the actual rotational speed of the crankshaft, and a reference rotational speed of the crankshaft; determining a filtered rotational speed of the first monitored shaft by passing the biased rotational speed of the first monitored shaft through a low-pass filter; comparing the filtered rotational speed of the first monitored shaft to the actual rotational speed of the first monitored shaft; determining whether the actual rotational speed of the first monitored shaft deviates from the filtered rotational speed of the first monitored shaft by a predetermined amount; and activating an alarm if the actual rotational speed of the first monitored shaft deviates from the filtered rotational speed of the first monitored shaft by the predetermined amount.

The invention, in another form thereof, is directed to a work machine. The work machine includes an engine having a crankshaft. A work assembly is configured to perform a work function. The work assembly has at least one monitored shaft drivably coupled to the crankshaft of the engine. A shaft monitor system has a monitor and a plurality of sensors communicatively coupled to the monitor. The plurality of sensors monitor a rotational speed of the crankshaft and the at least one monitored shaft. The monitor includes a controller and an alarm. The monitor executes program instructions to identify a critical reduction in shaft speed of each monitored shaft. The program instructions perform the acts of determining an actual rotational speed of the crankshaft; determining an actual rotational speed of a first monitored shaft; determining a filtered rotational speed of the first monitored shaft based on an algorithm that utilizes the actual rotational speed of the first monitored shaft, the actual rotational speed of the crankshaft, and a reference rotational speed of the crankshaft; comparing the filtered rotational speed of the first monitored shaft to the actual rotational speed of the first monitored shaft; determining whether the actual rotational speed of the first monitored shaft deviates from the filtered rotational speed of the first monitored shaft by a predetermined amount; and activating the alarm if the actual rotational speed of the first monitored shaft deviates from the filtered rotational speed of the first monitored shaft by the predetermined amount.

DETAILED DESCRIPTION OF THE INVENTION

Figure 1:
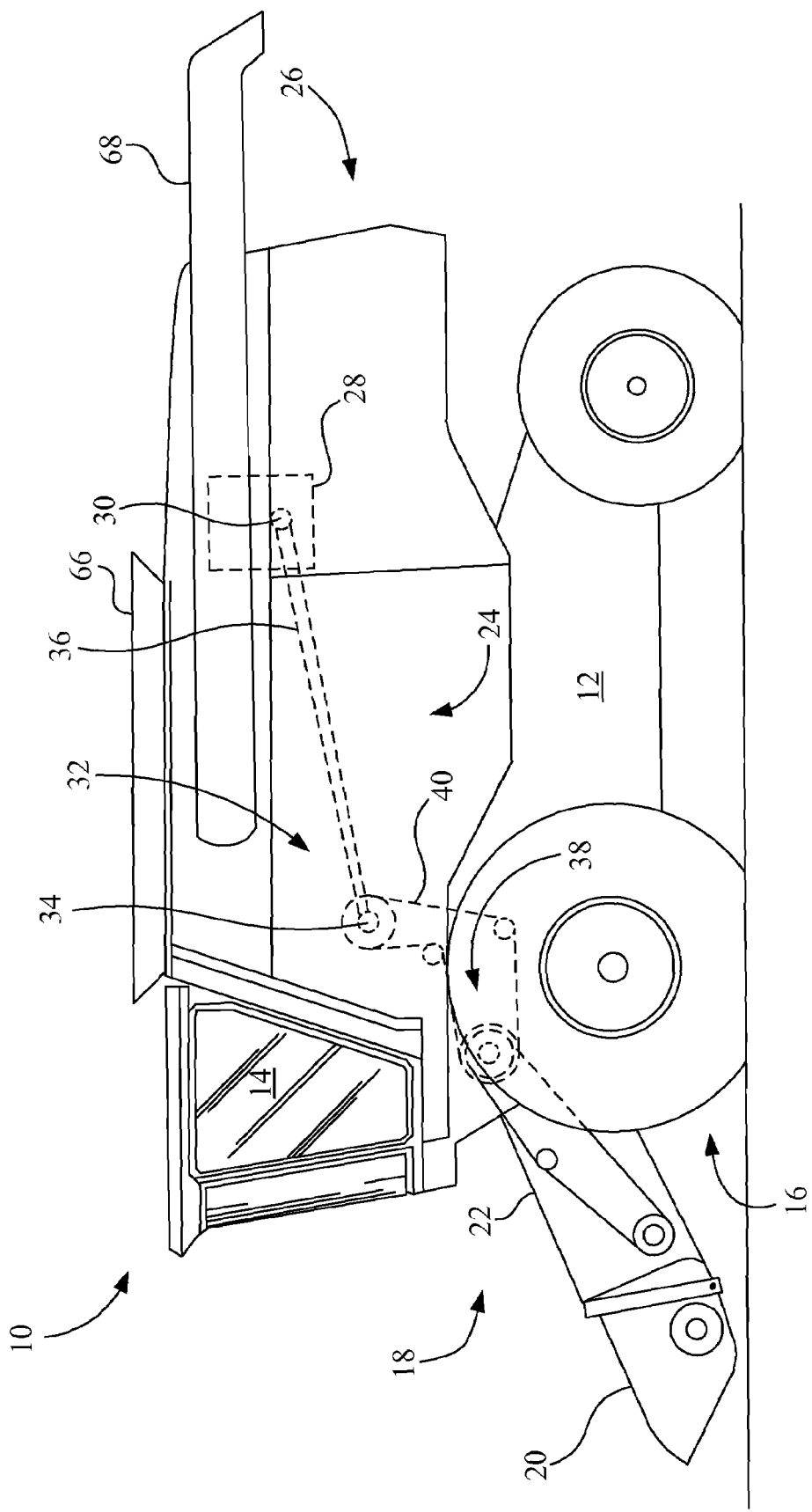
FIG. 1 is a diagrammatic left side view of a work machine in the form of an agricultural combine embodying the present invention.

Referring now to the drawings, and more particularly to FIG. 1, there is shown a work machine 10 in the form of a self-propelled agricultural combine. Although the invention is being described as being incorporated into a combine, it is contemplated that the present invention may be used with other types of work machines having one or more monitored rotatable shafts.

Work machine 10, in the form of an agricultural combine, includes a supporting structure 12. An elevated operator's station 14 is mounted at the front of work machine 10. A propulsion unit 16, which may include tires and/or tracks that engage the ground, is coupled to supporting structure 12, and performs propulsion and/or steering functions.

A work assembly 18 is coupled to supporting structure 12, and is configured to perform a work function. In the present embodiment of work machine 10 configured as an agricultural combine, work assembly 18 may include a harvesting platform 20, a feederhouse 22, a main separator unit 24, and a crop residue processing unit 26. Harvesting platform 20, such as a corn head, bean head, etc., is used for harvesting a crop and directing the crop to feederhouse 22. The harvested crop is directed by feederhouse 22 to main separator unit 24, which performs threshing, separating and cleaning operations. Crop residue is then directed to crop residue processing unit 26, which in turn may further shred and spread the crop residue over the field.

A transversely oriented internal combustion engine 28 provides the mechanical power needed to perform the propulsion, harvesting, threshing, separating, cleaning, and crop residue processing operations. Engine 28 includes a crankshaft 30 coupled to a belt-type drive system 32. Belt-type drive system 32 includes a primary countershaft 34 connected to crankshaft 30 of engine 28 by a shaft and gearbox configuration 36, which is schematically illustrated. A variable speed assembly 38 is connected to the primary countershaft 34 by a drive belt 40, which in turn is coupled to various rotatable shafts in one or more of harvesting platform 20, feederhouse 22, main separator unit 24, and crop residue processing unit 26.

Figure 2:
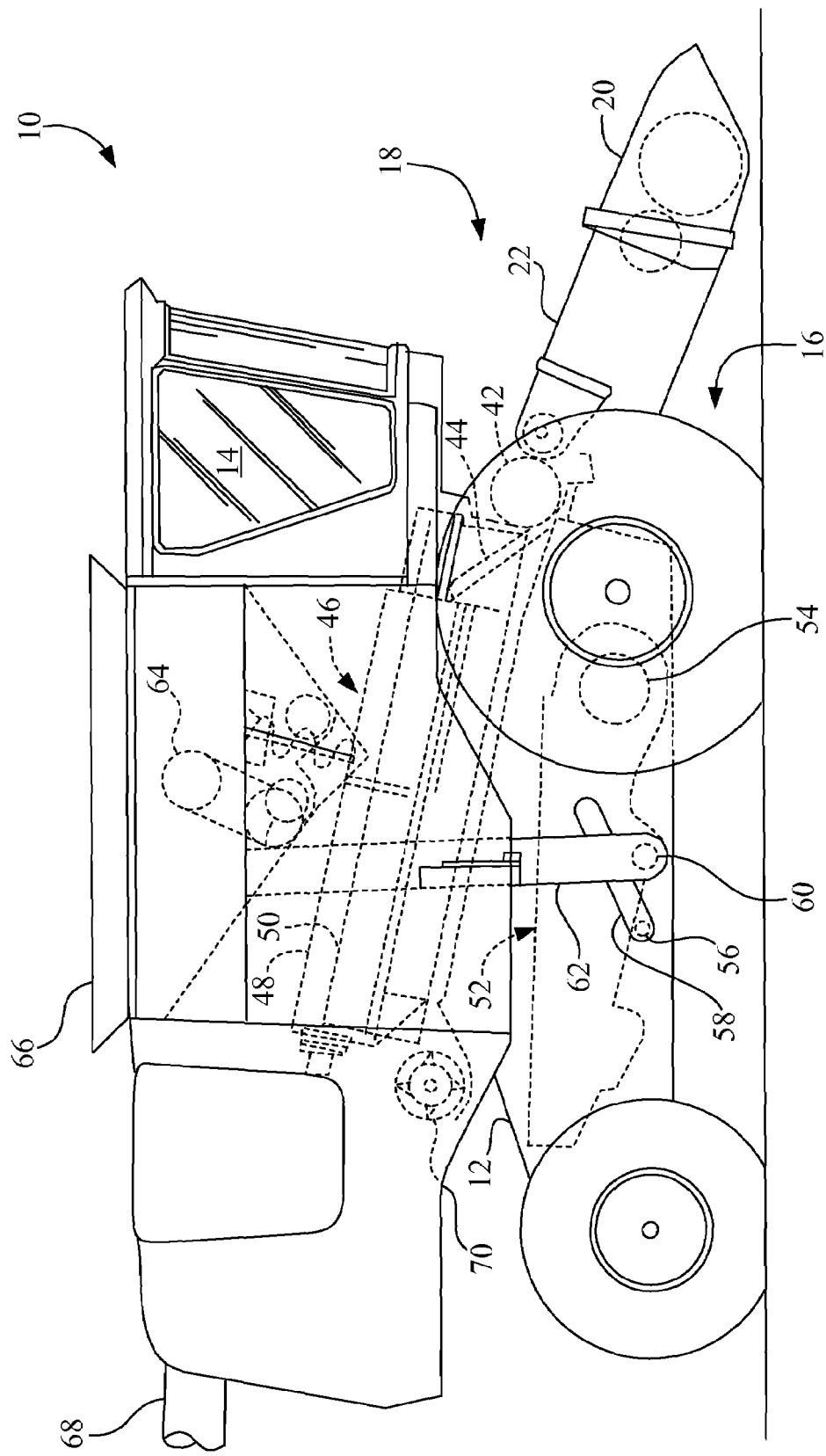
FIG. 2 is a diagrammatic right side view of the agricultural combine of FIG. 1.

Referring to FIG. 2, harvesting platform 20 facilitates harvesting a crop and directing the crop to feederhouse 22. The harvested crop is directed by feederhouse 22 to main separator unit 24. Main separator unit 24 includes a feed accelerator 42, which directs the harvested crop upwardly through an inlet transition section 44 to an axial crop processing unit 46.

Axial crop processing unit 46 is located between, and may be supported by the side sheets of work machine 10 and supporting structure 12. Axial crop processing unit 46 includes an axial rotor housing 48 and an axial rotor 50 located in axial rotor housing 48. The harvested crop enters axial rotor housing 48 through inlet transition section 44. Axial rotor 50 is provided with an infeed portion, a threshing portion and a separating portion. Axial rotor housing 48 has a corresponding infeed section, a threshing section and a separating section.

Both crop processing portions, the threshing portion and the separating portion, are provided with crop engaging assemblies. The threshing section of the axial rotor housing 48 is provided with a concave and the separating section is provided with a grate. Grain and chaff released from the crop mat falls through the concave and the grate. The concave and grate prevent the passage of crop material larger than grain or chaff from entering a cleaning system 52, which includes a cleaning fan 54.

Grain and chaff falling through the concave and grate is directed to cleaning system 52 which removes the chaff from the grain. A tailings auger 56 directs returns collected at the bottom of cleaning system 52 to tailings elevator 58 for redelivery to cleaning system 52 for reprocessing. The clean grain is directed by a clean grain auger 60 to a clean grain elevator 62, and in turn to a fountain auger 64. Fountain auger 64 directs the grain into a grain tank, or grain compartment, 66. The grain is removed from the grain tank 66 by an unloading auger 68.

As the crop residue, e.g., straw, stalks, chaff, dust, etc., reaches the end of the main separator unit 24 it is expelled through an outlet to crop residue processing unit 26. Crop residue processing unit 26 includes, for example, a beater 70 that propels the crop residue out the rear of the combine. Crop residue processing unit 26 may further include, for example, a straw chopper (not shown).

Figure 3:
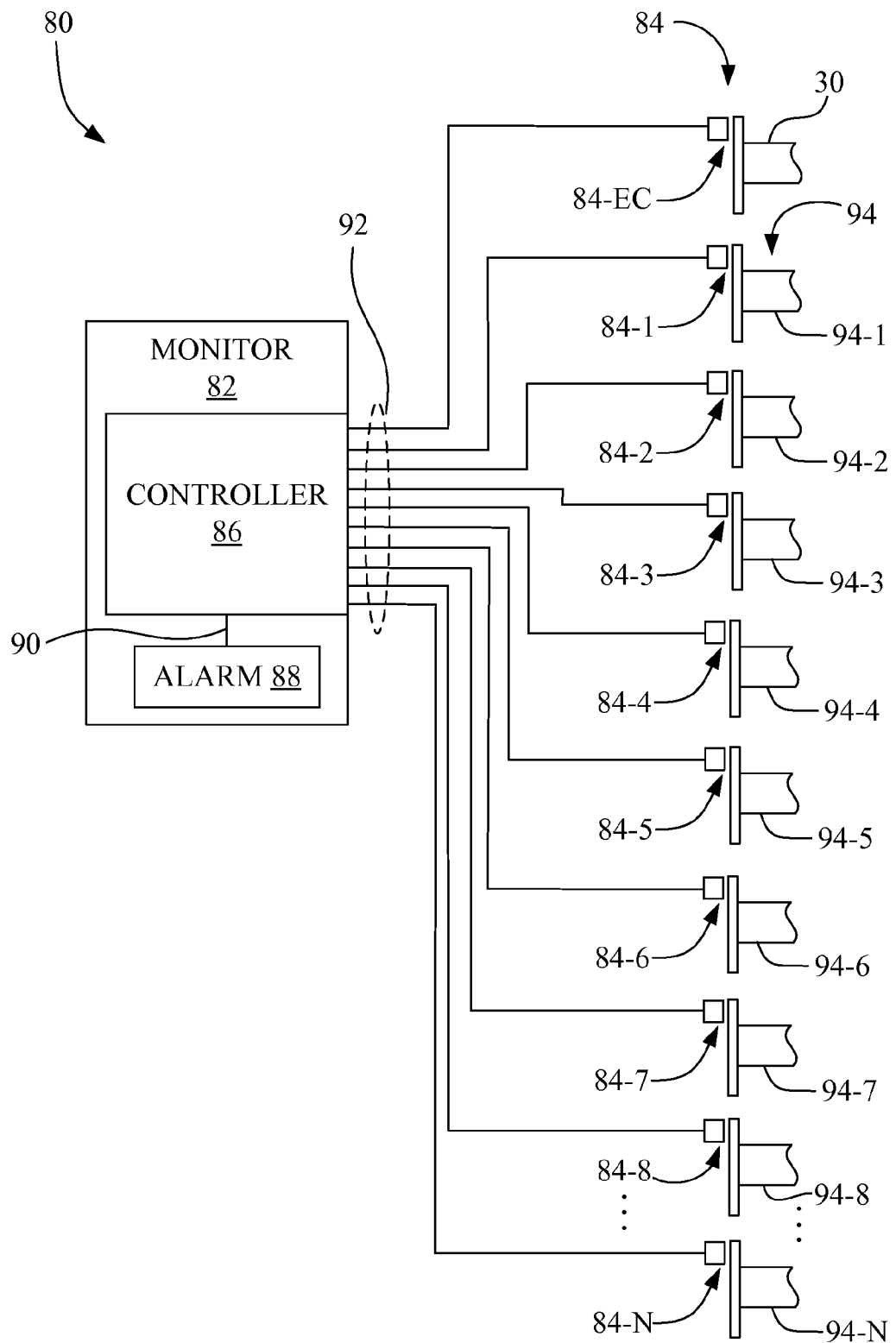
FIG. 3 is a block diagram depicting a shaft monitor system configured in accordance with an embodiment of the present invention.

Referring to FIG. 3, there is shown a block diagram of a shaft monitor system 80 configured in accordance with an embodiment of the present invention. Shaft monitor system 80 has a monitor 82 and a plurality of sensors 84. Monitor 82 may be mounted in the operator's station 14, and includes a controller 86 communicatively coupled to an alarm 88 by a wired connection 90. The plurality of sensors 84 is communicatively coupled to controller 86 of monitor 82 by a communication link 92, such as for example, a multi-conductor cable.

Controller 86 may be configured from hardware only, or hardware that utilizes firmware/software, that performs a predefined shaft monitoring operation. For example, controller 86 may be configured with a microprocessor and associated memory, with the instructions for performing a shaft monitoring operation being stored in the memory. Alternatively, the shaft monitoring routine may be hardwired in logic, such as in the form of an application specific integrated circuit (ASIC).

Alarm 88 may provide an audio and/or visual alarm indication that is perceptible by an operator of work machine 10. For example, an audio alarm indication may be a repetitive tone, or beep, and a visual alarm indication by be an illumination of a indicator light, or illumination of a portion of a diagrammatic picture of the monitored shafts.

The plurality of sensors 84, individually identified as sensors 84-EC, 84-1, 84-2, 84-3, 84-4, 84-5, 84-6, 84-7, 84-8 . . . 84-N in the present embodiment, may be used to monitor a rotational speed of crankshaft 30 and a rotational speed of a plurality of monitored shafts 94, individually identified as monitored shafts, 94-1, 94-2, 94-3, 94-4, 94-5, 94-6, 94-7, 94-8 . . . 94-N in the present embodiment, wherein N represents some finite number of monitored shafts. Each of the plurality of sensors 84 may be a sensor configuration known in the art, such as an inductive sensor arrangement, an optical sensor arrangement, a Hall-effect sensor arrangement, etc. In the present example embodiment wherein work machine 10 is an agricultural combine, monitored shafts 94-1, 94-2, 94-3, 94-4, 94-5, 94-6, 94-7, 94-8 . . . 94-N may be shafts, for example, respectively associated with feed accelerator 42, axial rotor 50, cleaning fan 54, tailings elevator 58, clean grain auger 60, clean grain elevator 62, discharge beater 70, and a straw chopper (optional). Each of the plurality of monitored shafts 94 is driven, indirectly or directly, by crankshaft 30 of internal combustion engine 28. Those skilled in the art will recognize that the number of monitored shafts may be increased or decreased from that shown in the present exemplary embodiment.

Figure 4:
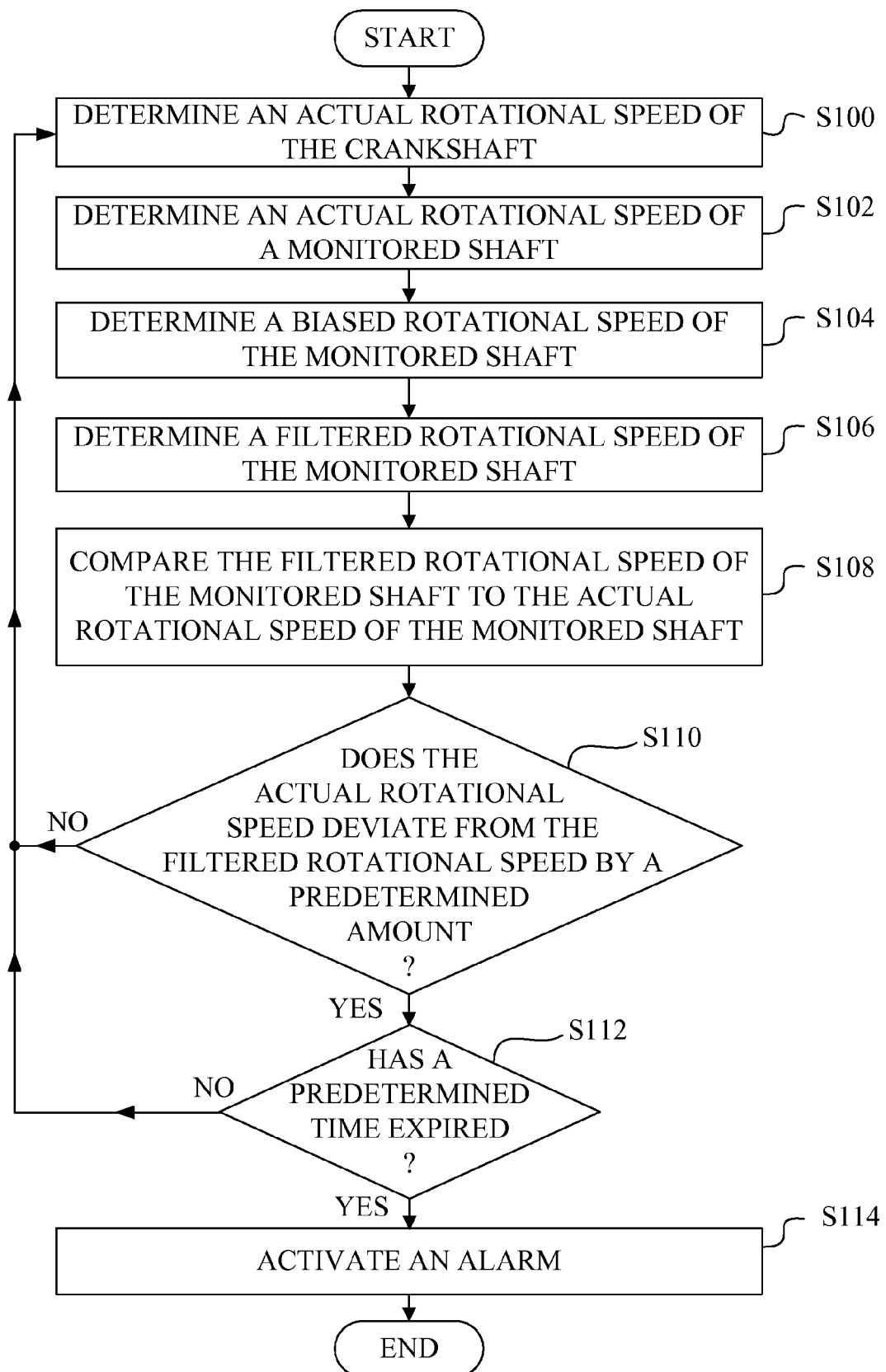
FIG. 4 is a flowchart of a method for determining a critical reduction in shaft speed of a monitored shaft in the work machine, utilized by the shaft monitor system of FIG. 3.

FIG. 4 is a flowchart of a method for determining a critical reduction in shaft speed in a work machine, such as work machine 10, in accordance with an embodiment of the present invention. The method may be performed, for example, as program instructions executed by the shaft monitor system 80 of FIG. 3.

At act S100, an actual rotational speed of the engine crankshaft is determined. The actual rotational speed of crankshaft 30 of engine 28 may be determined, for example, by sensor 84-EC generating a signal corresponding to the rotational speed of crankshaft 30, which in turn supplies the signal representing the actual rotational speed of crankshaft 30 to controller 86 of monitor 82. For example, where sensor 84-EC is an inductance sensor assembly, the initial signal may be indicative of a rotational frequency, which is translated by controller 86 into revolutions per minute (RPM). For example, SpeedRPM=SpeedHz×60/PPR, wherein SpeedRPM is the actual rotational speed in RPM, SpeedHz is the actual rotational speed in Hertz (frequency), and PPR is the number of output pulses per revolution of the monitored shaft.

At act S102, an actual rotational speed of a monitored shaft is determined. For example, the monitored shaft may be one of the plurality of monitored shafts 94 that is monitored by one of the corresponding plurality of sensors 84. For purposes of this example, it will be assumed that the shaft of interest is monitored shaft 94-2 associated with axial rotor 50 that is being monitored by sensor 84-2. In embodiments wherein sensor 84-2 is an inductance sensor assembly, the initial signal may be indicative of rotational frequency of monitored shaft 94-2, which is translated by controller 86 into revolutions per minute (RPM).

At act S104, a biased rotational speed of the monitored shaft, e.g., monitored shaft 94-2, is determined based at least on actual rotational speed of the monitored shaft, e.g., monitored shaft 94-2, the actual rotational speed of crankshaft 30, and a reference rotational speed of crankshaft 30. The reference rotational speed of crankshaft 30 is a constant having a value corresponding to a rated maximum rotational speed of crankshaft 30 of engine 28. In one embodiment, for example, the reference rotational speed of crankshaft 30 is 2340 RPM.

The act of determining the biased rotational speed may be calculated by controller 86 of monitor 82 based on logic represented by the equation:

$$BRSS = ARSS \times (ARSC/RRSC)$$

wherein:

BRSS is the biased rotational speed of the monitored shaft, e.g., monitored shaft 94-2;

ARSS is the actual rotational speed of the monitored shaft, e.g., monitored shaft 94-2;

ARSC is the actual rotational speed of crankshaft 30; and

RRSC is the reference rotational speed of crankshaft 30.

At act S106, a filtered rotational speed of the monitored shaft, e.g., monitored shaft 94-2, is determined by passing the biased rotational speed of the monitored shaft through a low-pass filter. The act of determining the filtered rotational speed of the monitored shaft may be calculated by controller 86 of monitor 82 based on the filtering logic represented by the equation:

$$FRSS = (FRSS_{pre} \times 99 + BRSS)/100$$

wherein:

FRSS is a current filtered rotational speed of the monitored shaft, e.g., monitored shaft 94-2;

$FRSS_{pre}$ is a previous filtered rotational speed of the monitored shaft, e.g., monitored shaft 94-2; and BRSS is the biased rotational speed of the monitored shaft, e.g., monitored shaft 94-2.

Thus, if biased rotational speed changes slowly over time (e.g., due to hydraulic temperature or operator adjustments), the filtering logic will prevent any alarms from being generated. However, if the biased rotational speed of the monitored shaft drops suddenly, then shaft monitor system 80 may generate an alarm notifying the operator of the low shaft speed, if all other conditions for generating the alarm have been met.

At act S108, the filtered rotational speed of the monitored shaft is compared to the actual rotational speed of the monitored shaft.

At act S110, it is determined whether the actual rotational speed of the monitored shaft deviates from the filtered rotational speed of the monitored shaft by a predetermined amount. In one embodiment, for example, the predetermined amount is selected to be 25 percent. However, those skilled in the art will recognize that the predetermined amount may be selected to be higher or lower than 25 percent, depending on the application and the desired sensitivity to change.

If the actual rotational speed of the monitored shaft does not deviate from the filtered rotational speed of the monitored shaft by the predetermined amount (i.e., the determination at act S110 is NO), then the process returns to act S100, and the process is repeated.

If the actual rotational speed of the monitored shaft deviates from the filtered rotational speed of the monitored shaft by the predetermined amount (i.e., the determination at act S110 is YES), then the process proceeds to act S112.

At act S112, it is determined whether a predetermined time has expired. In one embodiment, for example, the predetermined time is two seconds. However, those skilled in the art will recognize that the predetermined time may be selected to be higher or lower than two seconds, depending on the application and the desired sensitivity to change.

If the predetermined time has not expired (i.e., the determination at act S112 is NO), then the process returns to act S100, and the process is repeated.

If the predetermined time has expired (i.e., the determination at act S112 is YES), then the process proceeds to act S114.

At act S114, alarm 88 is activated, e.g., * by controller 86 of monitor 82, indicating that the monitored shaft, e.g., monitored shaft 94-2, has experienced a critical reduction in shaft speed.

The operator of work machine 10 may then take corrective action to remove the cause of the alarm activation. The alarm may be reset, for example, each time feederhouse 22 is disengaged, at which time shaft monitor system 80 will be set to re-learn the actual shaft speeds, and re-calculate the associated filtered rotational speed of each monitored shaft when feederhouse 22 is reengaged. Also, this ensures that any configuration changes (e.g., low-speed versus high-speed settings) will not result in nuisance alarms.

For ease of discussion, the method of FIG. 4 has been described with respect to a single monitored shaft, e.g., monitored shaft 94-2. However, in operation each of the monitored shafts 94 may be monitored by the method described above, either concurrently or sequentially.

The invention claimed is:

1. A method for determining a critical reduction in shaft speed in a work machine having at least one monitored shaft driven by a crankshaft of an engine, comprising:
    (a) determining an actual rotational speed of said crankshaft;
    (b) determining an actual rotational speed of a first monitored shaft;
    (c) determining a filtered rotational speed of said first monitored shaft based on an algorithm that utilizes said actual rotational speed of said first monitored shaft, said actual rotational speed of said crankshaft, and a reference rotational speed of said crankshaft;
    (d) comparing said filtered rotational speed of said first monitored shaft to said actual rotational speed of said first monitored shaft;
    (e) determining whether said actual rotational speed of said first monitored shaft deviates from said filtered rotational speed of said first monitored shaft by a predetermined amount; and
    (f) activating an alarm if said actual rotational speed of said first monitored shaft deviates from said filtered rotational speed of said first monitored shaft by said predetermined amount; and
    wherein acts (a) through (e) are performed for a predetermined time, and if said actual rotational speed of said first monitored shaft deviates from said filtered rotational speed of said first monitored shaft by said predetermined amount at the end of said predetermined time, then activating said alarm.

2. The method of claim 1, further comprising performing said method for each monitored shaft driven by said crankshaft of said engine.

3. The method of claim 1, wherein said reference rotational speed is a constant having a value corresponding to a rated maximum rotational speed of said crankshaft of said engine.

4. The method of claim 1, wherein said predetermined amount of deviation is about 25 percent.

5. A method for determining a critical reduction in shaft speed in a work machine having at least one monitored shaft driven by a crankshaft of an engine, comprising:
   (a) determining an actual rotational speed of said crankshaft;
   (b) determining an actual rotational speed of a first monitored shaft;
   (c) determining a biased rotational speed of said first monitored shaft based at least on said actual rotational speed of said first monitored shaft, said actual rotational speed of said crankshaft, and a reference rotational speed of said crankshaft;
   (d) determining a filtered rotational speed of said first monitored shaft by passing said biased rotational speed of said first monitored shaft through a low-pass filter;
   (e) comparing said filtered rotational speed of said first monitored shaft to said actual rotational speed of said first monitored shaft;
   (f) determining whether said actual rotational speed of said first monitored shaft deviates from said filtered rotational speed of said first monitored shaft by a predetermined amount; and
   (g) activating an alarm if said actual rotational speed of said first monitored shaft deviates from said filtered rotational speed of said first monitored shaft by said predetermined amount; and
   wherein acts (a) through (e) are performed for a predetermined time, and if said actual rotational speed of said first monitored shaft deviates from said filtered rotational speed of said first monitored shaft by said predetermined amount at the end of said predetermined time, then activating said alarm wherein acts (a) through (f) are performed for a predetermined time, and if said actual rotational speed of said first monitored shaft deviates from said filtered rotational speed of said first monitored shaft by said predetermined amount at the end of said predetermined time, then activating said alarm.

6. The method of claim 5, further comprising performing said method for each monitored shaft driven by said crankshaft of said engine.

7. The method of claim 5, wherein said reference rotational speed is a constant having a value corresponding to a rated maximum rotational speed of said crankshaft of said engine.

8. The method of claim 5, wherein said predetermined amount of deviation is about 25 percent.

9. A method, for determining a critical reduction in shaft speed in a work machine having at least one monitored shaft driven by a crankshaft of an engine, comprising:
   (a) determining an actual rotational speed of said crankshaft;
   (b) determining an actual rotational speed of a first monitored shaft;
   (c) determining a biased rotational speed of said first monitored shaft based at least on said actual rotational speed of said first monitored shaft, said actual rotational speed of said crankshaft, and a reference rotational speed of said crankshaft;
   (d) determining a filtered rotational speed of said first monitored shaft by passing said biased rotational speed of said first monitored shaft through a low-pass filter;
   (e) comparing said filtered rotational speed of said first monitored shaft to said actual rotational speed of said first monitored shaft;
   (f) determining whether said actual rotational speed of said first monitored shaft deviates from said filtered rotational speed of said first monitored shaft by a predetermined amount; and
   (g) activating an alarm if said actual rotational speed of said first monitored shaft deviates from said filtered rotational speed of said first monitored shaft by said predetermined amount, wherein the act of determining said biased rotational speed is calculated based on the equation:

$$BRSS = ARSS \times (ARSC/RRSC)$$

wherein:
   BRSS is said biased rotational speed of said first monitored shaft;
   ARSS is said actual rotational speed of said first monitored shaft;
   ARSC is said actual rotational speed of said crankshaft; and
   RRSC is said reference rotational speed of said crankshaft.

10. A method for determining a critical reduction in shaft speed in a work machine having at least one monitored shaft driven by a crankshaft of an engine, comprising:
   (a) determining an actual rotational speed of said crankshaft;
   (b) determining an actual rotational speed of a first monitored shaft;
   (c) determining a biased rotational speed of said first monitored shaft based at least on said actual rotational speed of said first monitored shaft, said actual rotational speed of said crankshaft, and a reference rotational speed of said crankshaft;
   (d) determining a filtered rotational speed of said first monitored shaft by passing said biased rotational speed of said first monitored shaft through a low-pass filter;
   (e) comparing said filtered rotational speed of said first monitored shaft to said actual rotational speed of said first monitored shaft;
   (f) determining whether said actual rotational speed of said first monitored shaft deviates from said filtered rotational speed of said first monitored shaft by a predetermined amount; and
   (g) activating an alarm if said actual rotational speed of said first monitored shaft deviates from said filtered rotational speed of said first monitored shaft by said predetermined amount, wherein the act of determining said filtered rotational speed of said first monitored shaft is calculated based on the equation:

$$FRSS = (FRSS_{pre} \times 99 + BRSS)/100$$

wherein:
   FRSS is a current filtered rotational speed of said first monitored shaft;
   $FRSS_{pre}$ is a previous filtered rotational speed of said first monitored shaft; and
   BRSS is said biased rotational speed of said first monitored shaft.

11. A work machine, comprising:
an engine having a crankshaft;
a work assembly configured to perform a work function, said work assembly having at least one monitored shaft drivably coupled to said crankshaft of said engine;
a shaft monitor system having a monitor and a plurality of sensors communicatively coupled to said monitor, said plurality of sensors configured to send at least one signal to said monitor dependent upon a rotational speed of said crankshaft and said at least one monitored shaft, said monitor including a controller and an alarm, said controller configured to execute program instructions to identify a critical reduction in shaft speed of each monitored shaft, including:
(a) determining an actual rotational speed of said crankshaft;
(b) determining an actual rotational speed of a first monitored shaft;
(c) determining a filtered rotational speed of said first monitored shaft based on an algorithm that utilizes said actual rotational speed of said first monitored shaft, said actual rotational speed of said crankshaft, and a reference rotational speed of said crankshaft;
(d) comparing said filtered rotational speed of said first monitored shaft to said actual rotational speed of said first monitored shaft;
(e) determining whether said actual rotational speed of said first monitored shaft deviates from said filtered rotational speed of said first monitored shaft by a predetermined amount; and
(f) activating said alarm if said actual rotational speed of said first monitored shaft deviates from said filtered rotational speed of said first monitored shaft by said predetermined amount; and
wherein said monitor performs acts (a) through (e) for a predetermined time, and if said actual rotational speed of said first monitored shaft deviates from said filtered rotational speed of said first monitored shaft by said predetermined amount at the end of said predetermined time, then activating said alarm.

12. The work machine of claim 11, further comprising performing said method for each shaft of said plurality of monitored shafts.

13. The work machine of claim 11, wherein said reference rotational speed is a constant having a value corresponding to a rated maximum rotational speed of said crankshaft of said engine.

14. The work machine of claim 11, wherein said predetermined amount of deviation is about 25 percent.

15. The work machine of claim 11, wherein the determining of the filtered rotational speed of said first monitored shaft is performed by:
determining a biased rotational speed of said first monitored shaft based at least on said actual rotational speed of said first monitored shaft, said actual rotational speed of said crankshaft, and said reference rotational speed of said crankshaft; and
passing said biased rotational speed of said first monitored shaft through a low-pass filter.

16. A work machine, comprising:
an engine having a crankshaft;
a work assembly configured to perform a work function, said work assembly having at least one monitored shaft drivably coupled to said crankshaft of said engine;
a shaft monitor system having a monitor and a plurality of sensors communicatively coupled to said monitor, said plurality of sensors configured to send at least one signal to said monitor dependent upon a rotational speed of said crankshaft and said at least one monitored shaft, said monitor including a controller and an alarm, said controller configured to execute program instructions to identify a critical reduction in shaft speed of each monitored shaft, including:
(a) determining an actual rotational speed of said crankshaft;
(b) determining an actual rotational speed of a first monitored shaft;
(c) determining a filtered rotational speed of said first monitored shaft based on an algorithm that utilizes said actual rotational speed of said first monitored shaft, said actual rotational speed of said crankshaft, and a reference rotational speed of said crankshaft;
(d) comparing said filtered rotational speed of said first monitored shaft to said actual rotational speed of said first monitored shaft;
(e) determining whether said actual rotational speed of said first monitored shaft deviates from said filtered rotational speed of said first monitored shaft by a predetermined amount; and
(f) activating said alarm if said actual rotational speed of said first monitored shaft deviates from said filtered rotational speed of said first monitored shaft by said predetermined amount
wherein the determining of the filtered rotational speed of said first monitored shaft is performed by:
determining a biased rotational speed of said first monitored shaft based at least on said actual rotational speed of said first monitored shaft, said actual rotational speed of said crankshaft, and said reference rotational speed of said crankshaft; and
passing said biased rotational speed of said first monitored shaft through a low-pass filter,
wherein the act of determining said biased rotational speed is calculated based on the equation:

$$BRSS = ARSS \times (ARSC/RRSC)$$

wherein:
BRSS is said biased rotational speed of said first monitored shaft;
ARSS is said actual rotational speed of said first monitored shaft;
ARSC is said actual rotational speed of said crankshaft; and
RRSC is said reference rotational speed of said crankshaft.

17. The work machine of claim 16, wherein the act of determining said filtered rotational speed of said first monitored shaft is calculated based on the equation:

$$FRSS = (FRSS_{pre} \times 99 + BRSS)/100$$

wherein:
FRSS is a current filtered rotational speed of said first monitored shaft;
$FRSS_{pre}$ is a previous filtered rotational speed of said first monitored shaft; and
BRSS is said biased rotational speed of said first monitored shaft.

* * * * *